United States Patent

[11] 3,611,167

[72] Inventors Richard W. Calfee;
E. Troy Hatley, both of San Jose, Calif.
[21] Appl. No. 843,381
[22] Filed July 22, 1969
[45] Patented Oct. 5, 1971
[73] Assignee Data Disc Incorporated
Palo Alto, Calif.

[54] PERIOD DEMODULATOR FOR SAMPLING ADJACENT PAIRS OF PULSE EVENTS
7 Claims, 13 Drawing Figs.

[52] U.S. Cl. .................................................. 329/106,
307/232, 307/134, 307/246, 328/111, 328/151,
329/126, 329/146
[51] Int. Cl. .................................................. H03k 9/08
[50] Field of Search .......................................... 329/106,
126, 146; 328/111, 112, 151; 307/232, 234, 246;
325/142

[56] References Cited
UNITED STATES PATENTS
3,413,412 11/1968 Townsend .................... 307/237 UX
3,440,548 4/1969 Saltzberg ..................... 328/151
3,473,131 10/1969 Perkins ........................ 328/151 X
3,479,528 11/1969 Fisher .......................... 328/151 X
3,508,158 4/1970 Marchese .................... 328/151 X Primary Examiner—Alfred L. Brody
Attorney—Flehr, Hohbach, Test, Albritton & Herbert ABSTRACT: A modulator and demodulator system for video recording in which the modulated signal is a train of pulses with the distance between any two pulse events proportional to the amplitude of the sampled video signal. By the use of appropriate sample and hold means in the demodulator any high frequency fundamental component of the modulated signal is nulled out during demodulation.

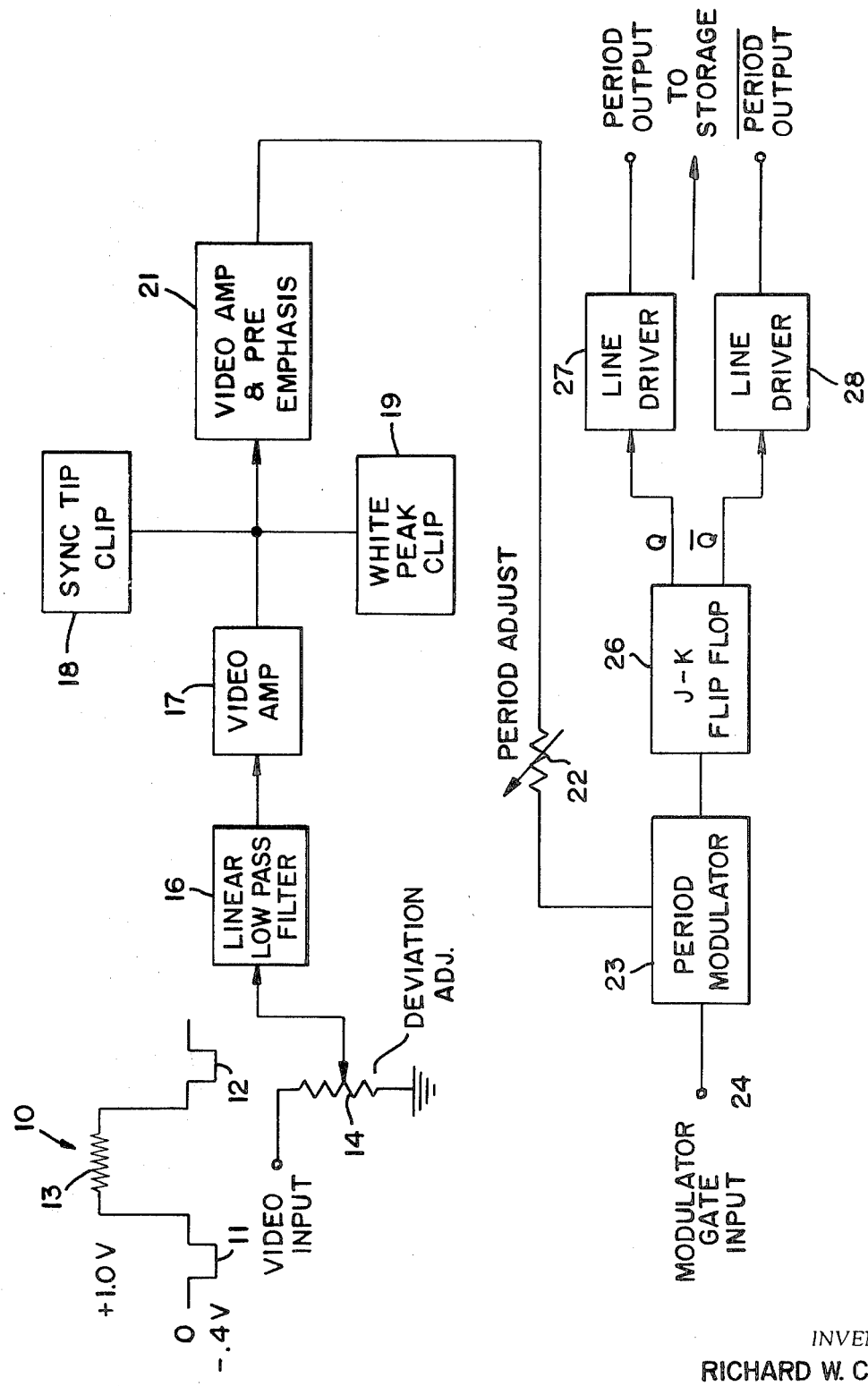
FIG_1

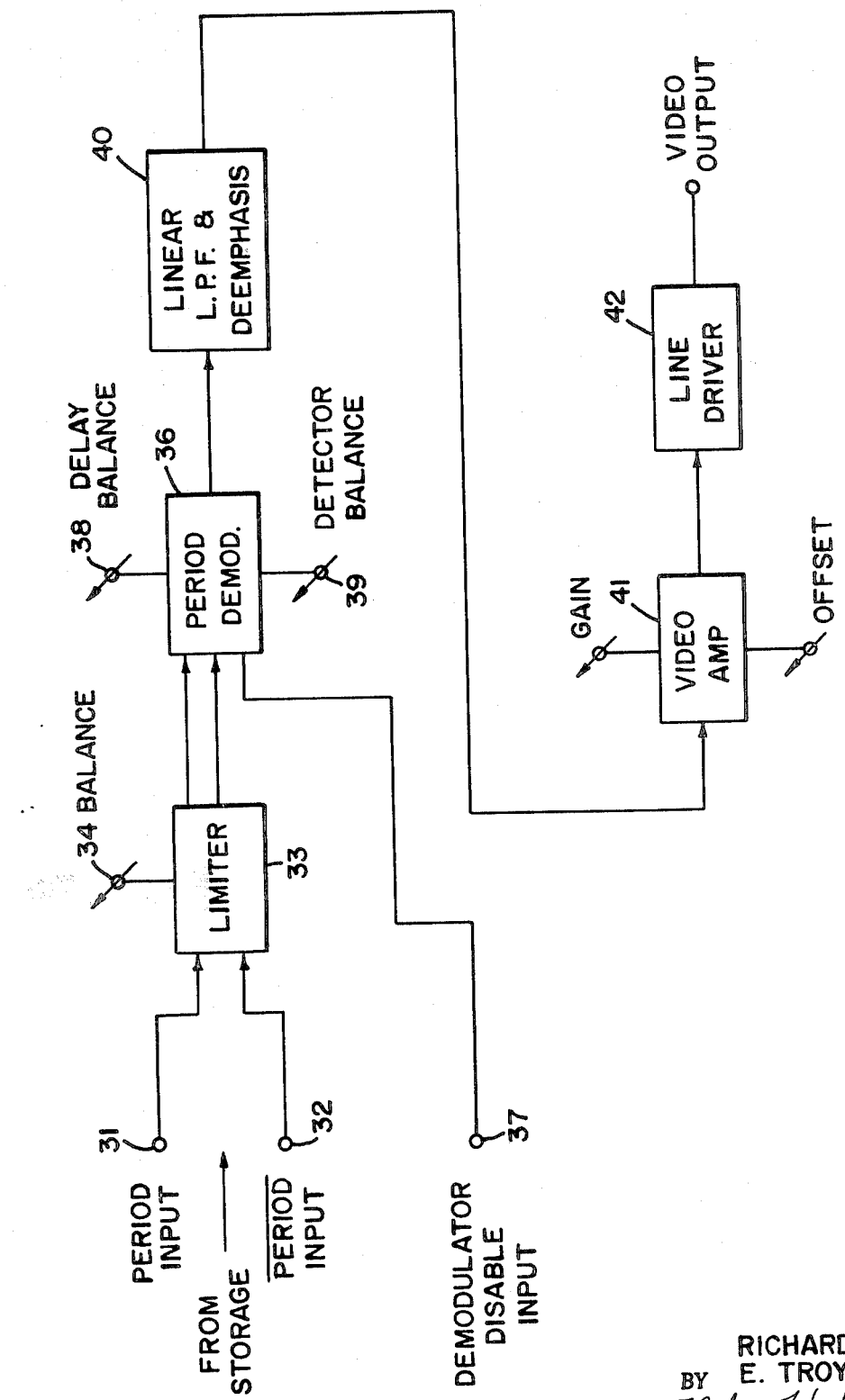
FIG_2

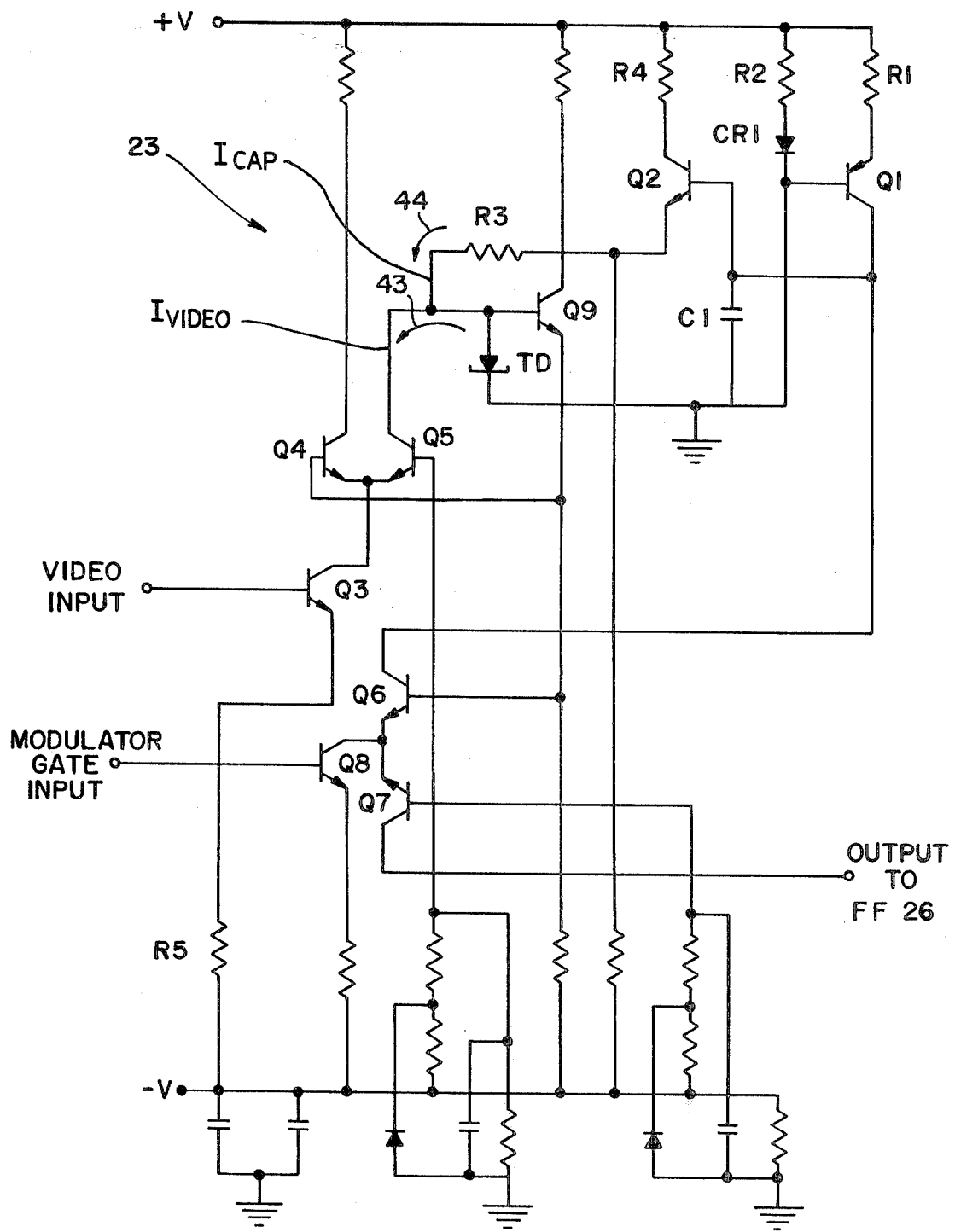
FIG_3

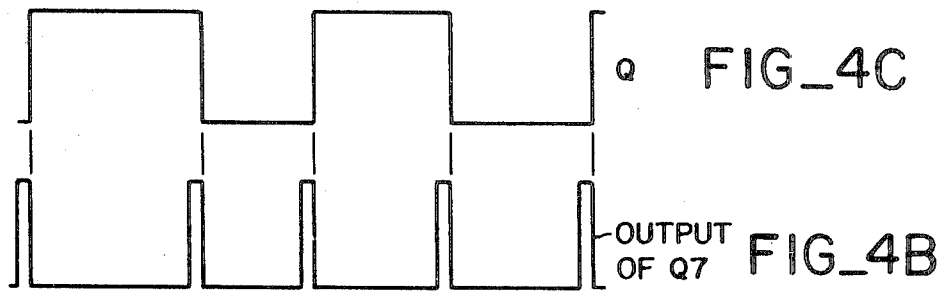
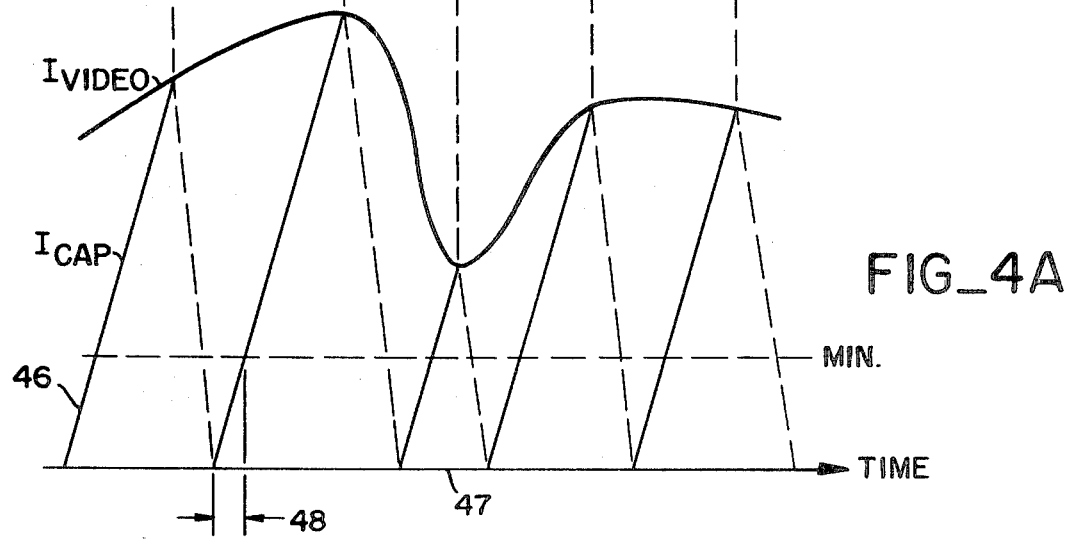
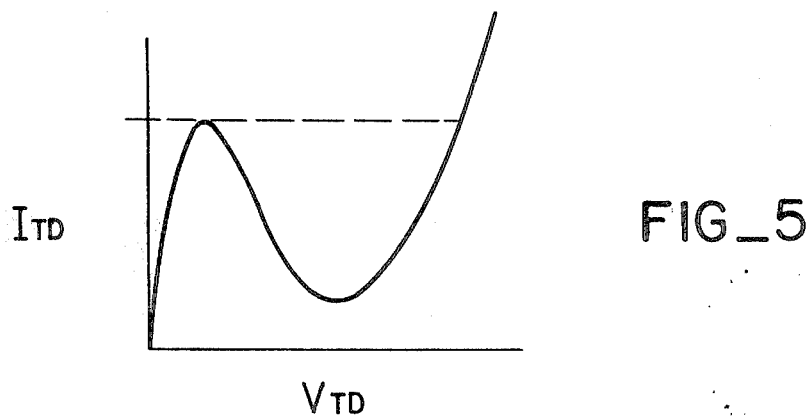

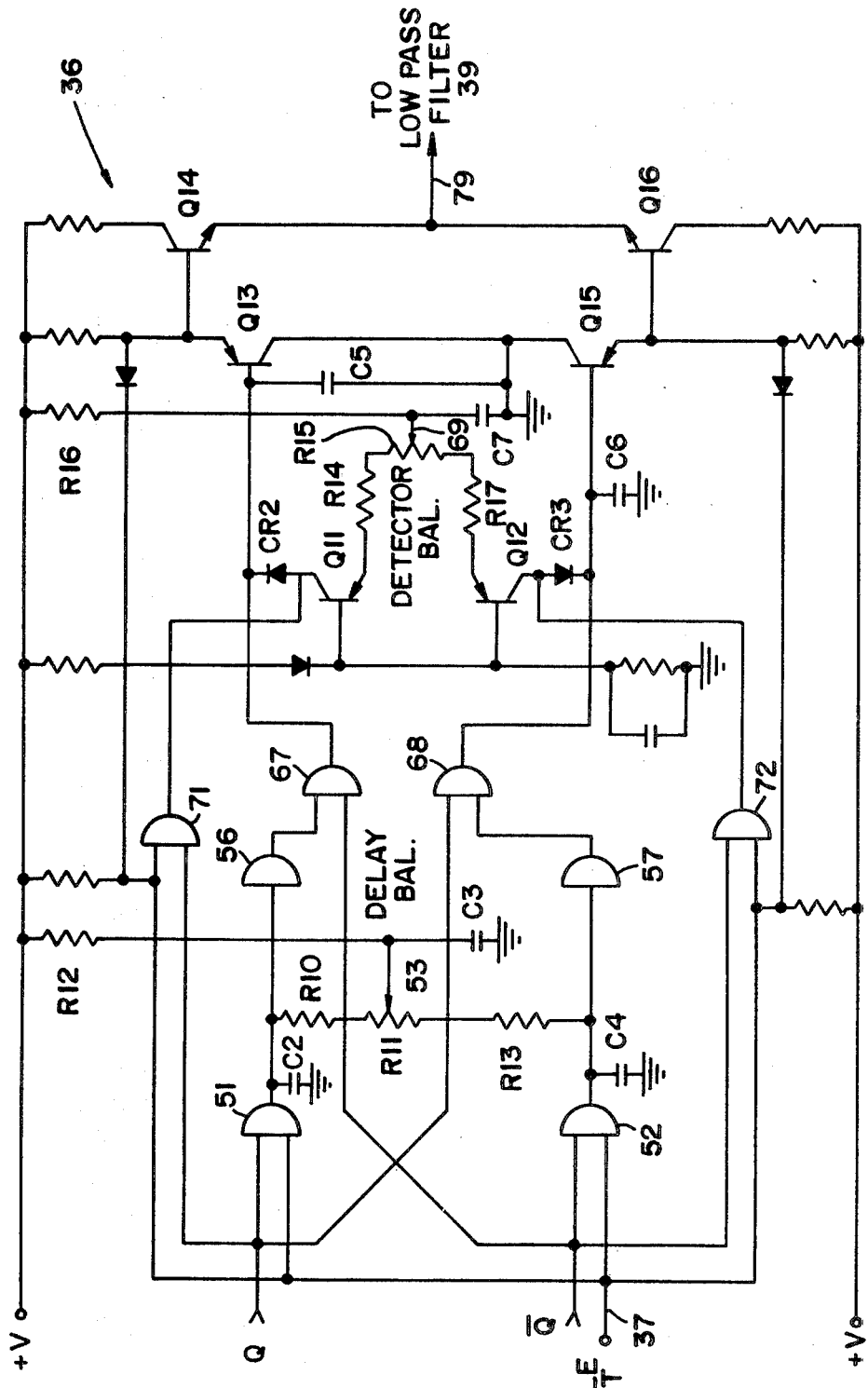
FIG_6

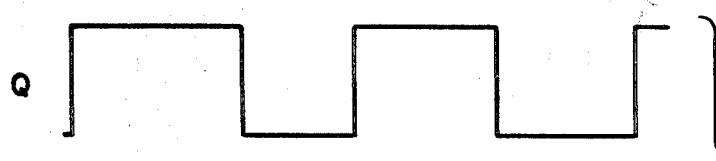
FIG_7A
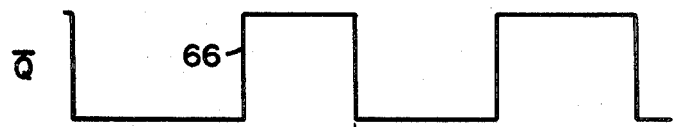
FIG_7B
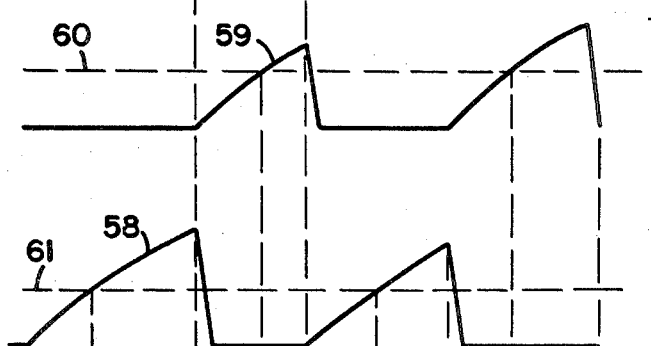
FIG_7C
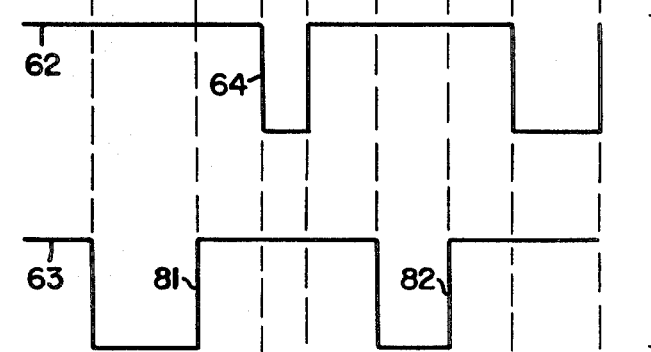
FIG_7D
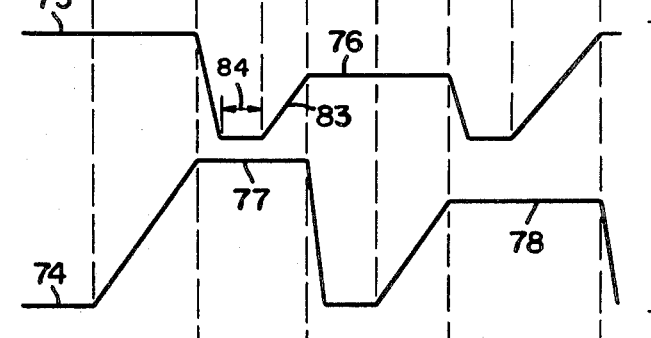
FIG_7E

PERIOD DEMODULATOR FOR SAMPLING ADJACENT PAIRS OF PULSE EVENTS

BACKGROUND OF THE INVENTION

The present invention is directed to a period modulator and demodulator which is especially adapted for use in a magnetic video memory system.

Present modulators and demodulators adapted for video systems are costly. Moreover, they do not lend themselves to easy integration because of the use of inductors.

OBJECTS AND SUMMARY OF THE INVENTION

It is, therefore, a general object of the present invention to provide an improved modulator and demodulator.

It is another object of the invention to provide a modulator and demodulator which are inexpensive and require no inductors.

In accordance with the above objects there is provided a modulator which comprises means for providing a pulse modulation signal having a sequence of pulse events and in which the time between adjacent events is proportional to the sampled amplitude of the modulating wave. These means include means for offsetting the modulating wave a predetermined amount for providing a minimum time between the pulse events.

The demodulator of the system includes means for providing complementary pulse modulation signals and first and second sample and hold means for alternately sampling adjacent pairs of the pulse events and respectively holding a signal indicative of the time between a corresponding pair of the pulse events. Means are provided for combining the held signals for producing an output signal similar to the original modulating wave.

BRIEF DESCRIPTION OF THE DRAWINGS

FIG. 1 is a block diagram of a modulator embodying the present invention;

FIG. 2 is a block diagram of a demodulator embodying the present invention;

FIG. 3 is a detailed circuit schematic of a portion of FIG. 1;

FIGS. 4A, 4B and 4C are waveforms useful in understanding the modulator portion of the invention;

FIG. 5 is a characteristic curve of a tunnel diode;

FIG. 6 is a circuit schematic of a portion of the demodulator circuit of FIG. 2;

FIGS. 7A through 7E are waveforms useful in understanding the demodulator of FIGS. 2 and 6.

DETAILED DESCRIPTION OF THE PREFERRED EMBODIMENT

Referring now to FIG. 1 there is illustrated a modulator having as an input a typical video signal 10 with negative synchronizing portions 11 and 12 and a video information portion 13. A nominal positive 1 volt is indicated as the white peak. A zero level would, of course, be the black level. The negative sync tips are at a nominal −0.4 volts.

The video input is coupled through a deviation adjustment potentiometer 14 to a linear phase low-pass filter 16. Deviation adjustment potentiometer 14 compensates for variations in signal input so that the actual signal level to the low-pass filter 16 falls within the nominal values indicated on the video waveform 10. Low-pass filter 16 eliminates unwanted high frequencies and its output is coupled to a typical video amplifier 17. The output of video amplifier 17 is coupled to a sync tip clip unit 18 and white peak clip unit 19 which provide a negative and positive clipping to eliminate unwanted noise.

After being clipped and amplified a video amplifier and preemphasis device 21 provides for normal preemphasis and its output is coupled through a period adjust potentiometer 22 to a period modulator 23. Period adjust potentiometer 22 adjusts the amplified video signal a predetermined offset value from, for example, ground level which will be discussed below. This provides a minimum time delay in the period-modulated modulation waves.

The period modulator 23 is activated through a modulator gate input 24. In general, period modulator 23 is responsive to the amplitude of the amplified video signal 10 to provide a sequence of pulse events in which the time between adjacent events is proportional to the amplitude of the sampled video modulating wave. These modulated signals activate a J–K type flip-flop 26 which has complementary outputs Q and $\bar{Q}$. These are coupled to line driver 27 and 28 which couple the modulated video signal to a storage medium such as video tape or a circular metal disk having a magnetic medium suitable for storage of electric signals.

When it is desired to retrieve and demodulate the video signals from the storage medium the complementary signals designated period input and $\overline{\text{period}}$ input (FIG. 2) are coupled to the dual inputs 31 and 32 of a limiter 33. Any imbalance in the two signals is corrected by a balance adjustment 34. The output of the limiter is then coupled to a period demodulator 36.

Demodulator 36 is enabled and disabled by a demodulator disable input 37. As will be described in more detail, the period demodulator includes a delay balance control 38 and detector balance control 39. The demodulated video signal from the output of period demodulator 36 is then coupled through a linear phase low-pass filter device 40 with deemphasis through a typical video amplifier 41 to a line driver 42 which has the original video signal as an output. Video amplifier 41 includes gain and offset adjustments as illustrated.

Period modulator 23 is shown in greater detail in FIG. 3. Modulator 23 includes a timing capacitor C1 which is coupled to and charged by a constant current source which includes a transistor Q1 having its collector coupled to capacitor C1, its emitter coupled to a positive voltage source through a resistor R1 and its base coupled through a diode CR1 and series-connected resistor R2 to the same positive voltage source. A current I cap representative of the amount of charge stored by the capacitor C1 at any given time is coupled to a tunnel diode designated TD through a transistor Q2 having its base input coupled to capacitor C1 and an emitter connected to resistor R3 as shown by arrow 44. The collector of transistor Q2 is coupled through resistor R4 to the positive voltage source.

The video input signal from video amplifier and preemphasis unit device 21 (FIG. 1) is coupled into the base of a transistor Q3 which has its emitter returned to the negative voltage source through an emitter resistor R5. The collector of Q3 is coupled to the tied emitter terminals of a differential amplifier which consists of transistors Q4 and Q5. The bases of these transistors are biased by appropriate components as illustrated.

Normally, the video input signal causes a flow of current through Q3 and Q5 and the tunnel diode in accordance with the magnitude of video signal. This flow of current is indicated by the arrow 43. Such current flows through the tunnel diode in its reverse or nonswitching direction of high conductance. Current due to the charge on capacitor C1 also flows through resistor R3 as indicated by the arrow 44 through the transistors Q5 and Q3. Thus, in the normal condition where the current due to the video signal is greater than the capacitor current, the current flowing through Q3 and Q5 will include the capacitor current and any additional current is made up by the reverse flow through the tunnel diode.

In this condition in a second differential amplifier consisting of transistors Q6 and Q7, Q6 is in a nonconductive condition and Q7 is conductive. The collector of Q6 is coupled to capacitor C1 and the collector of Q7 designed output coupled to J–K flip-flop 26. Again, appropriate base biasing is provided transistors Q6 and Q7. The emitters of these transistors are coupled together and to a common transistor Q8 which has as its base input the modulator gate input. This provides for activation of the entire modulator circuit.

A transistor Q9 has its base input coupled to the tunnel diode and its emitter output to the base of Q6 and the base of Q4.

The operation of modulator 23 is more clearly understood with the aid of FIGS. 4A, 4B, 4C and FIG. 5. Referring first to FIG. 4A along with FIG. 3 where the video current designated, $I_{video}$ 43, is greater than the current, $I_{cap}$ 44, due to the stored charge on capacitor C1, the capacitor will initially charge as indicated by the line 46. Current flow through the tunnel diode is indicated by arrow 43. However, when $I_{cap}$ equals $I_{video}$ the current through the tunnel diode will no longer be necessary to supplement the capacitor current. As $I_{cap}$ begins to slightly exceed $I_{video}$, current through the tunnel diode will flow in an opposite or forward direction to cause it to operate in accordance with the tunnel diode characteristic shown in FIG. 5. Namely, a small forward current, for example, 1 milliampere causes a sharp step switching of the tunnel diode to a relatively high voltage condition. When this occurs, the high voltage condition on the tunnel diode is sensed by transistor Q9 which switches to an on condition. The switching of Q9 then causes two concomitant switching functions. First the differential amplifier Q6, Q7 is switched causing an output pulse to occur on the collector output of Q7 as illustrated in FIG. 4B. At the same time Q6 becomes conductive to dump the charge which is in capacitor C1. The second event is the resetting of differential amplifier Q4, Q5 to cause the flow of video current to cease. When the capacitor C1 discharges down to a predetermined level the entire sequence again starts. As illustrated by FIGS. 4B and 4C, the output of Q7 is coupled to flip-flop 26 which produces a waveform on its Q output as illustrated in FIG. 4C. The trailing edges of the pulses of FIG. 4B cause the switching of the flip-flop. It is evident from the inspection of FIGS. 4B and 4C that the distance between the pulses or the pulse events of 4B or the leading or trailing edges of FIG. 4C are proportional to the sampled amplitude of the video modulating wave.

As discussed above also with regard to FIG. 1 the period adjust device 22 provides a minimum time between these events by insuring that the video current as illustrated in FIG. 4A never reaches the zero or reference level designated 47. Thus, for example, the minimum level as indicated, provides minimum time 48 between pulse events.

As shown in FIG. 2 the period and the inverted period signal designated Q and $\overline{Q}$ are retrieved from storage and coupled through limiter 33 to the period demodulator 36 which is more fully illustrated in FIG. 6. These signals are initially coupled to NAND gates 51 and 52 respectively. NAND gate 51 has as its other coincidence input, disable input 37 which enables and disables the overall demodulator. The output of NAND gate 51 which is the Q period signal charges a capacitor C2 through resistors R10 and one-half of resistor R11. Resistor R11 is a part of the delay balance control which includes a moving contact 53 coupled between positive supply potential and ground through resistor R12 and a capacitor C3 respectively. Similarly, capacitor C4 is charged by the output of gate 52 through resistor R13 and one-half of balance resistor R11.

The amount of charge on C2 and C4 respectively is coupled into the threshold gates 56 and 57 which produce an output only when the input has, for example, a 1.4-volt threshold. This is best illustrated in FIGS. 7A and 7B where the Q and $\overline{Q}$ signals are shown and where in FIG. 7B the output of gates 51 and 52 are indicated by the waveforms 58 and 59 respectively. Each waveform 58 and 59 has a charging portion whose slope is determined by the respective charging capacitor and resistance and a threshold 60 and 61 respectively as determined by the gates 56 and 57. Discharge of C2 and C4 occurs when the outputs of gates 51 and 52 go "low" in response to a "high" condition on both gates inputs.

The output of gate 57 is illustrated by the waveform 63 (FIG. 7C) and of the gate 56 by the waveform 62. It is apparent from examination of the waveforms of FIG. 7C that a delay in the leading edge, for example, 64 of pulse train 62 with respect to the leading edge 66 of the $\overline{Q}$ period pulse occurs due to the capacitor-resistor time delay.

The output gates 56 and 57 are coupled to gates 67 and 68 which sample their pulse outputs. Sampling gates 67 and 68 are also coupled to the Q and $\overline{Q}$ input pulse trains for the purpose of appropriate timing. When both inputs to the gates are "high" then output is "low." The output of gate 67 is coupled to and allows the charging of a holding capacitor C5 and similarly the output of sample gate 68 is coupled to and allows the charging of a holding capacitor C6. The charging rate of capacitor C5 is determined by the current source which includes Q11 and by the associated resistor R14 and one-half of detector balance resistor R15. The detector balance resistor has a moving contact 69 which is coupled to ground through a capacitor C7 and to the positive voltage source through resistor R16. Thus resistor R15 and contact 69 form a potentiometer. The charging rate of capacitor C6 is determined by the current source which includes Q12 and by the resistor R17 and the other half of resistor R15. Resistors R14 and R17 are also coupled to the emitters of transistors Q11 and Q12 respectively to supply appropriate biasing. The collectors of Q11 and Q12 are coupled to gates 71 and 72 and to holding capacitor C5 and C6 through diodes CR2 and CR3. Gates 71 and 72 have as coincidence inputs the disable input 37 and the Q and $\overline{Q}$ period pulses. When both inputs are "high" the output terminal of a gate is "low" or in a low impedance current-sinking state.

As indicated in FIG. 7D by the curves 73 and 74 the output pulses (FIG. 7C) from the gates 67 and 68 are sampled alternately by the capacitors C5 and C6 to provide a signal indicative of the time between the corresponding pair of pulse events of the Q and $\overline{Q}$ period waveforms. Waveform 73 of FIG. 7D is associated with waveform 62 of FIG. 7B to thus provide at 76 a held level which is indicative of the pulse width of the pulse 64. With regard to waveform 74 of FIG. 7D the held levels are 77 and 78 which correspond to the pulse width of pulses 81 and 82 respectively. When these levels are combined in transistors Q13 through Q16 on the output 79 the final signal of FIG. 7E results which is the reconstructed video input signal. Transistors Q13 through Q16 serve, in effect, as an exclusive OR gate.

The stored charge in capacitors C5 and C6 is dumped or discharged by the switching of gates 67 and 68 to their "low" conditions.

The detector balance control 69 in conjunction with Q11, Q12 and CR2, CR3 provide for balancing of the two waveforms 73 and 74 of FIG. 7D to eliminate any high frequency component which is due to or could be derived from the sequence of pulse events of Q and $\overline{Q}$ waveforms. The balanced demodulator thus provides for demodulation in a simple, economical manner with the nulling out of this usually troublesome frequency component. The timing circuits associated with the holding capacitors C5 and C6 allow one capacitor to be discharged and charged as indicated in FIG. 7D while the charge on the other is being held. This allows for faster switching action and improves the overall performance of the circuit.

More specifically transistors Q11 and Q12 act as current sources. The current flows from the collector terminals either to the "low" outputs of gates 71 and 72 or through diodes CR2 and CR3 to charge capacitors C5 and C6. Thus charging occurs when the respective gates 71 and 72 have a "high" output which unclamp CR2 and CR3. In their "low" states they act as current sinks. The charging and discharging of C5 and C6 is therefore controlled by gates 71 and 72 and 67 and 68. The Q and $\overline{Q}$ inputs to these gates thus provide the charging and discharging of one capacitor while the other is being discharged.

The delay in the leading edge of the pulses as illustrated in FIG. 7C provided by capacitors C2 and C4 provides for greater amplification and accuracy as is apparent by the characteristic curves of FIG. 7D. In other words, this time delay, for example, at 84 allows in essence a steeper charging slope at 83 to increase the overall sensitivity of the circuit. In other words, there can be greater change in the output voltage of the capacitor for a given change in pulse width of, for example, pulse 64.

Thus in summary, an improved modulator and demodulator have been provided which are inexpensive and in view of the use of the capacitors and the unique modulation system require no inductors and this is suitable for integrated circuit use.

We claim:

1. In a demodulator for demodulating a pulse modulation signal having a sequence of pulse events and in which the time between adjacent events is proportional to the sampled amplitude of the modulating wave, means for providing complementary pulse modulation signals, first and second sample and hold means for alternately sampling adjacent pairs of said pulse events and respectively holding a signal indicative of the time between a corresponding pair of said pulse events, means for combining said held signals for producing an output signal similar to said modulating wave.

2. A demodulator as in claim 1 in which said combining means includes balancing means for nulling out any high-frequency component due to said sequence of pulse events.

3. A demodulator as in claim 2 in which both of said sample and hold means include a pair of capacitors coupled together, and said balancing means includes a potentiometer connected to said coupled capacitors.

4. A demodulator as in claim 1 in which both of said sample and hold means include a pair of capacitors for holding said signals, together with means for discharging and charging one of said capacitors while the charge on the other capacitor is being held.

5. A demodulator as in claim 1 together with first means responsive to a first pair of said pulse events to generate a pulse having leading and trailing edges, a pulse width proportional to said time between said pulse events, and where said leading edge is delayed a predetermined time with respect to the first in time of said pulse events, and together with second means responsive to a second pair of said pulse events adjacent to said first pair and having a common pulse event to generate a pulse having leading and trailing edges, a pulse width proportional to said time between said pulse events and where said leading edge is delayed a predetermined time with respect to the first in time of said adjacent pulse events.

6. A demodulator as in claim 5 together with balancing means for equalizing said respective time delays.

7. A demodulator as in claim 5 in which both of said sample and hold means include a pair of capacitors respectively responsive to said delayed pulses said respective magnitudes of said held signals being determined by said pulse widths of said respective delayed pulses.